(12) United States Patent
Zhang et al.

(10) Patent No.: US 8,605,949 B2
(45) Date of Patent: Dec. 10, 2013

(54) VEHICLE-BASED IMAGING SYSTEM FUNCTION DIAGNOSIS AND VALIDATION

(75) Inventors: Wende Zhang, Troy, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 13/307,236

(22) Filed: Nov. 30, 2011

(65) Prior Publication Data

US 2013/0136309 A1    May 30, 2013

(51) Int. Cl.
*G06K 9/00* (2006.01)

(52) U.S. Cl.
USPC .......................................................... 382/104

(58) Field of Classification Search
None
See application file for complete search history.

(56) References Cited

U.S. PATENT DOCUMENTS

| | | | | |
|---|---|---|---|---|
| 5,670,935 | A * | 9/1997 | Schofield et al. | 340/461 |
| 6,323,776 | B1 * | 11/2001 | Jackson et al. | 340/679 |
| 6,553,130 | B1 * | 4/2003 | Lemelson et al. | 382/104 |
| 8,073,261 | B2 * | 12/2011 | Skans | 382/209 |
| 2003/0026455 | A1 * | 2/2003 | Watanabe et al. | 382/104 |
| 2004/0169745 | A1 * | 9/2004 | Franz | 348/241 |
| 2005/0010798 | A1 * | 1/2005 | Boo | 713/200 |
| 2005/0062615 | A1 * | 3/2005 | Braeuchle et al. | 340/903 |
| 2006/0206243 | A1 * | 9/2006 | Pawlicki et al. | 701/1 |
| 2008/0215231 | A1 * | 9/2008 | Breed | 701/117 |
| 2011/0317020 | A1 * | 12/2011 | Medina et al. | 348/192 |
| 2012/0127309 | A1 * | 5/2012 | Lee | 348/148 |

OTHER PUBLICATIONS

Adell, E.; Varhelyi, A.; Alonso, M.; Plaza, J., "Developing human-machine interaction components for a driver assistance system for safe speed and safe distance," Intelligent Transport Systems, IET , vol. 2, No. 1, pp. 1,14, Mar. 2008.*

* cited by examiner

*Primary Examiner* — Vu Le
*Assistant Examiner* — Samah Beg

(57) ABSTRACT

A method of determining functionality of a vision-based imaging system for a vehicle includes capturing images by the vision-based imaging system. The images include landmarks that are identified in multiple images for distinguishing displacement of landmarks between the images. Edge maps for each of the images are generated. Like regions of at least two edge maps are compared for distinguishing displacement of a landmark between the at least two edge maps. Each pixel location of a first edge map is compared with a same pixel location of a second edge map for determining whether each compared pixel location has a different intensity value. An aggregate number of pixel locations having a different intensity value between the at least two edge maps is determined and compared to a threshold. An error message is generated in response to the aggregate number being less than the threshold.

20 Claims, 3 Drawing Sheets

VEHICLE-BASED IMAGING SYSTEM FUNCTION DIAGNOSIS AND VALIDATION

BACKGROUND OF INVENTION

An embodiment relates generally to vehicle vision-based systems.

Vision-based image systems such as rear-back up cameras are used to generate a real-time scene for the driver of surrounding environment of the vehicle while the vehicle is stationary or backing up. This allows a driver to monitor if any obstacles, such as a human, are in the travel path of the rearward driven vehicle. The system relies on a vision-imaging device such as a video camera capturing images of a region behind the vehicle as it travels rearward. The captured image is transmitted to a video display screen within the passenger compartment where the captured environment is displayed to a driver.

A problem may present itself when the video exhibits a non-functional condition which is unnoticed by the driver. A non-functional condition may occur if the video signal is freezing during transmission or is blocked by dirt or another object. A driver casually glancing at the video screen may be unaware that in the short distance that the vehicle travels, the captured image has not changed. As a result, it would be advantageous to automatically detect whether the video-based imaging system is functioning properly.

SUMMARY OF INVENTION

An advantage of an embodiment is the detection of errors in a vision-based imaging system and the notification to a driver of the vehicle of such errors. The system utilizes captured images from a vehicle vision-based imaging system for identifying landmarks within the image at different instances of times. The landmarks are compared for distinguishing whether movement has occurred between the captured images. This is accomplished by generating edge maps and comparing the pixel locations of the edge maps for determining whether an image has frozen or is blocked. In addition, a validation technique is applied for validating the operability of the vision-based imaging system. The validation technique may utilize only the captured images of the vision-based imaging device or may utilize another existing sensing device on the vehicle for validating the operation of the vision-based imaging device. The advantage is that the system utilizes only existing components on the vehicle to diagnose and analyze the functionality of the vision-based imaging system.

An embodiment contemplates a method of determining functionality of a vision-based imaging system for a vehicle. Images are captured by the vision-based imaging system. The images include landmarks that are identified in multiple images for distinguishing displacement of landmarks between the images. A processing module generates an edge map for each of the images. Like regions of at least two edge maps are compared for distinguishing displacement of a landmark between the at least two edge maps. Each edge map is constructed of pixels having varying intensity values. Each pixel location of a first edge map is compared with a same pixel location of a second edge map. Each of the same pixel locations of the at least two edge maps are compared within one another for determining whether each compared pixel location has a different intensity value. An aggregate number of pixel locations is determined having a different intensity value between the at least two edge maps. A determination is made whether the aggregate number is greater than a threshold for indicating displacement of the landmarks between the at least two edge maps. An error message is generated in response to the aggregate number being less than the threshold.

DETAILED DESCRIPTION

Figure 1:
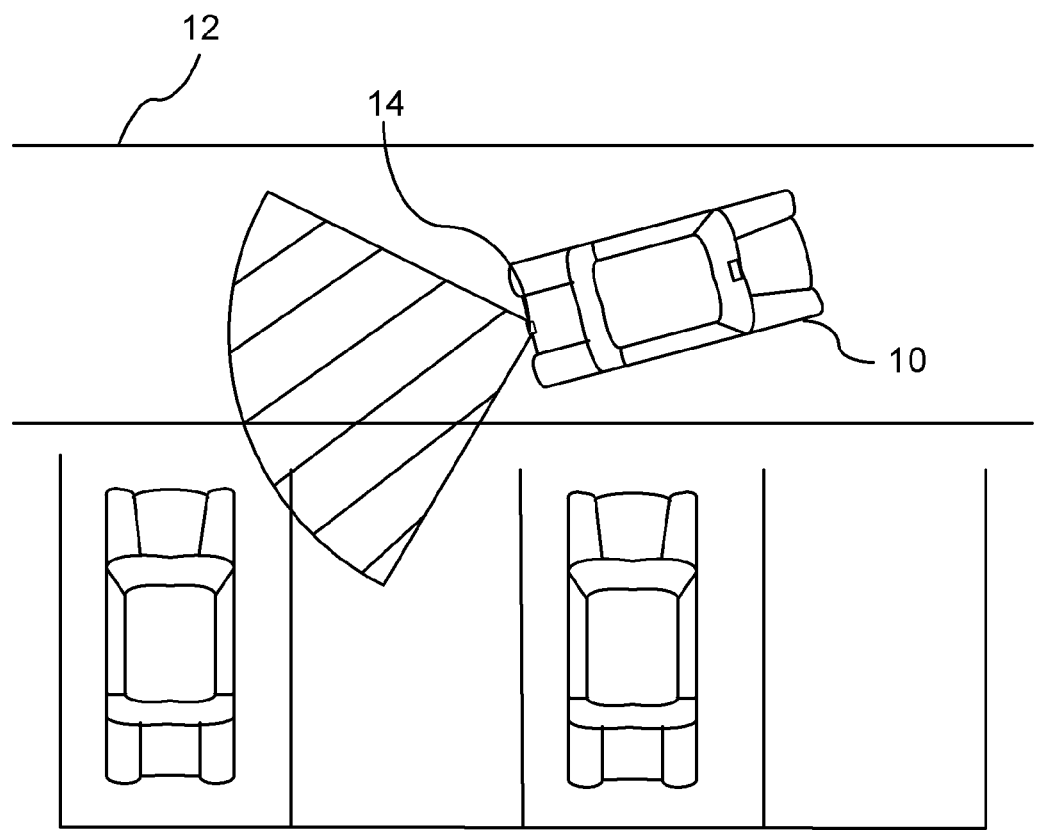
FIG. 1 is a plan view of a vehicle capturing an image of a road.

There is shown in FIG. 1, a vehicle 10 traveling along a road 12. A vision-based imaging system 14 captures images of the road of the vehicle 10 for detecting images in the feasible region of travel (hereinafter referred to as clear path). The vision-based imaging system 14 captures images rearward of the vehicle when the vehicle is stationary, moving rearward, or moving forward. In the embodiments described herein, the vision-based imaging system will be described as capturing images rearward of the vehicle; however, it should also be understood that the vision-based imaging system 14 can be extended to capturing images forward of the vehicle and to the sides of the vehicle. The vision-based imaging system 14, as shown in FIG. 1, displays objects rearward of the vehicle when the vehicle is driving in a rearward direction, forward direction, or stationary. In a preferred embodiment, the vision-based imaging system 14 is used to identify the clear path or lane markings in the road for systems such as, but not limited to, back-up object detection, lane departure warning systems, or lane centering. The vision-based imaging system 14 includes a vision-based imaging device that is preferably mounted in an exterior location of the vehicle (e.g., juxtaposed to the license plate) for capturing the environment exterior and rearward of the vehicle. Although the vision-based imaging system 14 may be used for a variety of functions (e.g., video imaging for displaying the environment behind the vehicle when backing up), the embodiments described herein utilize the captured image to recognize landmarks including, but not limited to, road markings, lane markings, road signs, buildings, trees, humans, or other roadway objects so that movement of landmarks between image frames of the video can be detected. An example of such systems includes, but is not limited to, backup detection systems and rear-view imagery where it is imperative that the system is able to identify objects in the rearward travel path of the vehicle.

Figure 2:
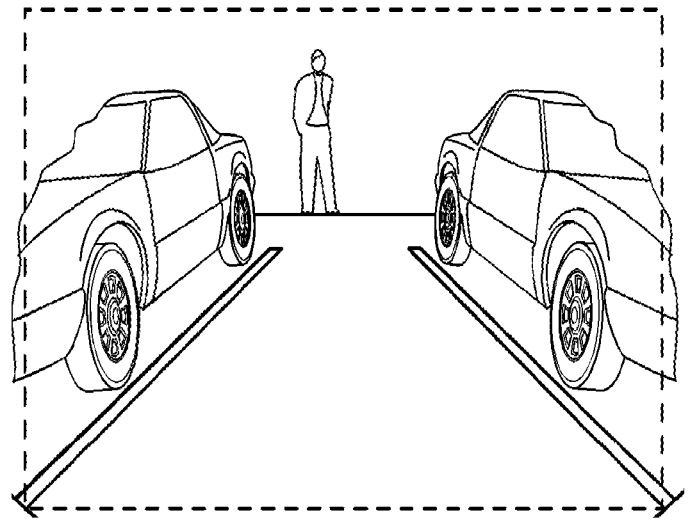
FIG. 2 is an image captured by a vision-based imaging device.
Figure 3:
FIG. 3 is a graph of edge map data.

FIG. 2 illustrates an image captured by the vision-based imaging system on the vehicle. Any of the landmarks within the captured image can be used to detect temporal differences between the images. For each image captured, edge maps are generated by a processing module so that texture analysis may be applied to the image. An edge map for the captured image is shown in FIG. 3. The edge map generates edges of objects. The edges are comprised of pixels having values that represent the different shading conditions of the landmarks within the edge map. Once the edge map is constructed, regions within an edge map for a first image is compared to a same region of an edge map for a second image for determining a temporal difference between the pixels of the two compared edge maps. Based on the comparison of the same regions of the respective edge maps, a determination may be made as to whether the capture image system is operating properly.

Figure 4:
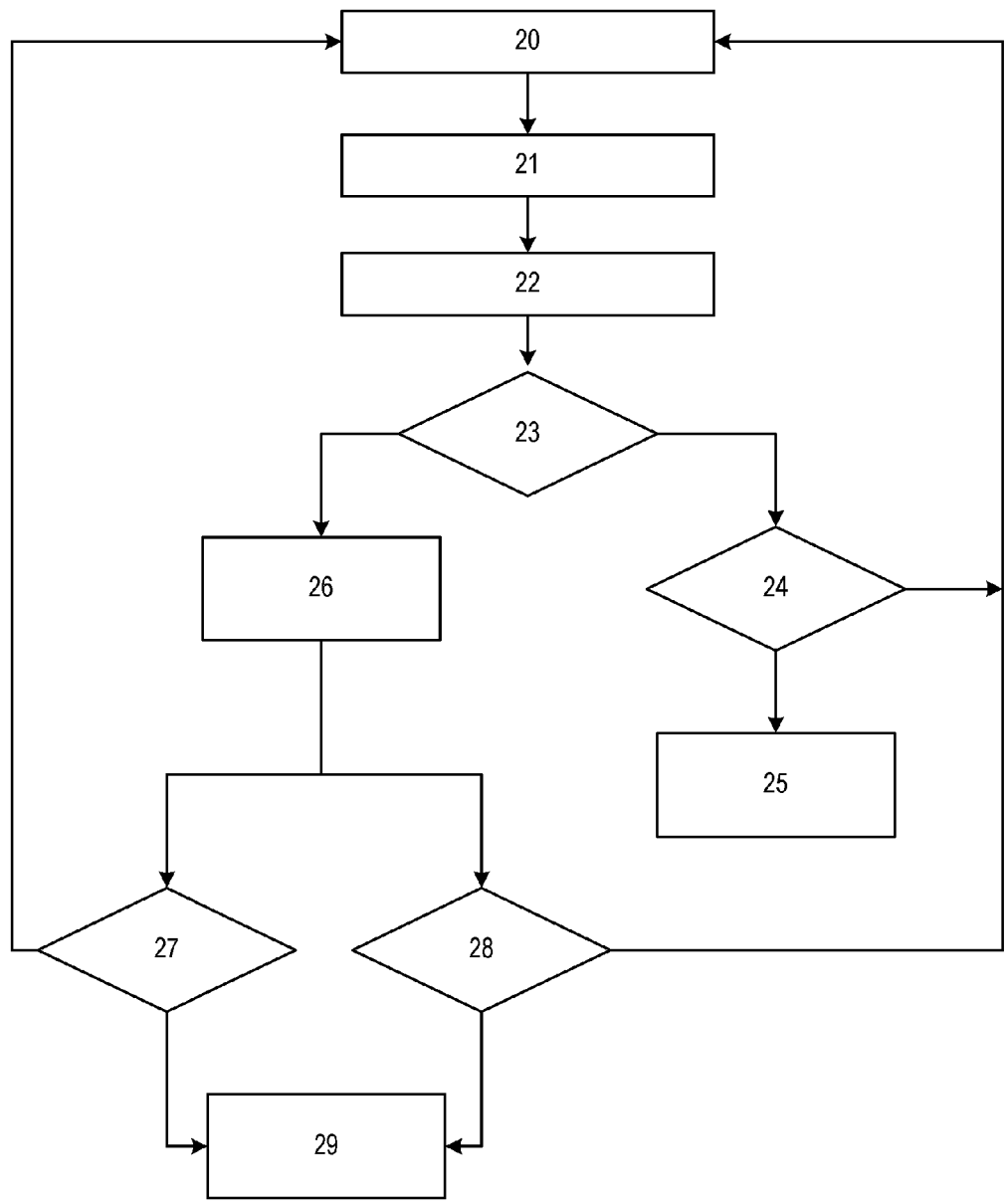
FIG. 4 is a flowchart of a method for determining image capture errors.

FIG. 4 illustrates a flowchart for a method for determining whether the vision-based imaging system is functioning properly. In step 20, images are captured by a vision-based imaging device. The vision-based imaging device may include a video camera or similar device.

In step 21, images are selected for texture analysis and an edge map is generated for each captured image for analyzing the texture of the landmarks in each image. It should be understood that an edge map is only one technique used to differentiate landmarks within the image and that other techniques can be used. The original image contains edges that are induced by surface and illumination transitions. The edge map may include a vertical edge map or a horizontal edge map. The vertical edge map data is generated by detecting vertical edges of the input map data. Only vertical edges of the objects in the input map data are used in generating the vertical edge map data. An illustration of the vertical edge map data is shown in FIG. 3. In order to detect vertical edges, the input image is viewed as a matrix of pixels. A correlation filter is applied to the input image. Any of several filters which magnify changes in the horizontal direction and attenuate changes in the vertical direction may be used. Alternatively, a horizontal edge map may be generated and analyzed.

In step 22, a landmark displacement technique is performed on the edge maps of the two images selected for comparison. In performing a landmark displacement technique, substantially similar regions are selected within each image. The same regions of at least two substantially similar edge map regions are compared for determining whether a same pixel location within the respective regions have different intensity values. A variation in the intensity values between a same pixel location for subsequent images which would indicate movement of vehicle with respect to the landmarks or repositioning of the landmarks between the two captured images. This is performed by identifying whether pixel locations of the first edge map have a different intensity value than the same pixel locations of the second edge map. After each associated pixel location within the first and second edge maps of the respective regions are compared, an aggregate number of the combination of the pixel locations of the first and second edge maps having different intensity values is generated.

In step 23, the aggregate number is compared to a threshold. A determination is made whether the aggregate number is greater than the threshold. An aggregate number less than the threshold may indicate that identified landmarks in both respective edge maps have not moved and that the same image is being continuously captured. If the determination is made that aggregate number is not greater than the threshold, then the routine proceeds to step 24, otherwise the routine proceeds to step 26.

In step 24, a determination is made whether the vehicle is moving. If the vehicle is not moving, then immobility of the vehicle would provide rationale as to why there is no change in the location of the landmarks between subsequent frames of the captured image. If determination is that the vehicle is not moving when the images are captured, then a return is made to step 20. If the determination is made that the vehicle is moving when the images are captured, then the routine proceeds to step 25.

In step 25, a message is actuated indicating that an error has occurred with the vision-based image system. The error may be the result of the video being paused, or that the viewing region is blocked by obstacles (e.g., by dirt or a towed trailer), or that the camera signal is freezing during transmission. The error message may be a visual, audible, or haptic message that is generated by an output device. For example, if the error message is a visual message, the message may be visually displayed on a video-based imaging output display screen that displays the captured video image to the driver of the vehicle. This ensures that the driver when viewing the output display screen, the driver is made aware of the inoperability of the vision-based imaging system.

Referring again to step 23, if the determination was made that the summation is greater than the threshold, then a lane marker identification validation technique is initiated in step 26. A successful validation indicates that that the video-imaging system is operating properly. The validation techniques described herein utilize landmarks, such as lane markers, that are detected from the vision-based imaging device. Steps 27 and 28 describe lane marker validation techniques for determining whether a validation has failed.

In step 27, two sensing devices are used to determine whether the vision-based imaging system is valid. The detected lane marker of the current image captured by the vision-based imaging device is compared with the lane marking detection results from another sensing device. The other sensing device may include another vision-based image device (e.g., front video camera, radar/lidar sensors, GPS and map). Movement of the vehicle is not taken into consideration since the images are obtained from two separate sensing devices and may be obtained a substantially a same instance of time. As a result, a temporal difference in the images is not required when validating the vision-based imaging device. If there is a substantial distinction between the lane markers of the two devices, then there is an indication that one of the sensing devices may not be operating correctly. The vision-based imaging device should not be relied on as a result of the inconsistency between the sensing devices. Therefore, an error message is actuated in step 29.

If the images captured by vision-based imaging device and the other sensing device match, a determination is made that the vision-based imaging device is operating properly and no action is require. The routine returns to step 20 to continue to monitor the vision-based image system for errors.

In step 28, another validation technique is applied. The validation technique described in step 28 utilizes temporal differences in the images captured only by the vision-based imaging device. A detected lane marker from a previous frame is matched with the detected lane marker of the present frame. In order to perform validation based solely on the single sensing device, the vehicle has to be moving in order to compare the temporal images. If the vehicle is not moving, then validation cannot be performed as this respective technique requires a displacement of the lane markers captured by the vision-based imaging device, which can only be obtained if the vehicle has moved.

If the vehicle is moving, then at least one characteristic of the lane marker of the previous frame is compared with a corresponding characteristic of the lane marker of the current frame. The characteristics include, but are not limited to, position, orientation, configuration, shape, design, pattern, or arrangement. If there is no match between the detected characteristics, then validation has failed and an error message is actuated in step 29. The error may be the result of a video feed being incorrectly connected within the vision-based image system, the vision-based image system is not properly calibrated, or the lane sensing system is not consistent or robust. If there is a match between the detected characteristics, then no action is taken and the routine returns to step 20 to continue to monitor for errors in the vision-based image device or system.

While certain embodiments of the present invention have been described in detail, those familiar with the art to which this invention relates will recognize various alternative designs and embodiments for practicing the invention as defined by the following claims.

What is claimed is:

1. A method of determining functional validity of a vision-based imaging system for a vehicle, the method comprising the steps of:
    capturing successive images by the vision-based imaging system mounted to a vehicle, the images including landmarks that are identified in multiple images for distinguishing displacement of landmarks between the images;
    generating an edge map for each of the images by a processing module;
    comparing like regions of at least two edge maps for distinguishing displacement of a landmark between the at least two edge maps, each edge map being constructed of pixels having varying intensity values, wherein each pixel location of a first edge map is compared with a same pixel location of a second edge map, wherein each of the same pixel locations of the at least two edge maps are compared within one another for determining whether each compared pixel location has a different intensity value; and
    determining an aggregate number of pixel locations having a different intensity value between the at least two edge maps;
    determining whether the aggregate number is greater than a threshold for indicating displacement of the landmarks between the at least two edge maps;
    generating an error message to a driver in response to the aggregate number being less than the threshold;
    validating a functionality of the vision-based imaging system in response to the aggregate number being greater than a threshold; and
    generating an error message by an output device in response to determining invalidity of the functionality of the vision-based imaging system.

2. The method of claim 1 wherein generating an error message in response to the aggregate number being less than the threshold comprises:
    determining whether the vehicle is moving in response to the aggregate number being less than the threshold; and
    generating an error message by an output device only in response to the determination that the vehicle is moving.

3. The method of claim 2 wherein the error message indicates that an imaging signal transmitted within vision-based imaging system is paused.

4. The method of claim 2 wherein the error message indicates that an image captured by the vision-based imaging system is blocked by an object.

5. The method of claim 1 wherein validating a functionality of the vision-based imaging system includes validating an identification of a lane marker of the road captured by the vision-based imaging system.

6. The method of claim 5 wherein validation of the vision-based imaging system comprises:
    determining whether the vehicle is moving;
    identifying a lane marker by the vision-based imaging system in response to a determination that the vehicle is moving;
    comparing the identified lane marker in at least two of the images;
    determining a characteristic of the lane marker in the first image for comparison with the characteristic of the lane marker in the second image; and
    invalidating the functionality of the vision-based imaging system in response to the characteristic of the lane marker of the first image not matching the characteristic of the lane marker of the second image.

7. The method of claim 6 wherein the characteristic of the lane marker includes a position of the lane marker within the images.

8. The method of claim 6 wherein the characteristic of the lane marker includes an orientation of the lane marker within the images.

9. The method of claim 5 wherein validation of the vision-based imaging system further comprises:
    identifying a lane marker by the vision-based imaging system;
    identifying the lane marker by a secondary sensing system of the vehicle;
    comparing the lane marker captured by the vision-based imaging system with the lane marker captured by the secondary sensing system; and
    invalidating vision-based imaging system in response to the lane marker captured by the vision-based imaging system not matching the lane marker captured by the secondary sensing system.

10. The method of claim 9 wherein the vision-based imaging system includes a rear vision-based imaging device, and wherein identifying the lane marker by a secondary sensing system includes identifying the lane marker using a forward vision-based imaging device.

11. The method of claim 9 wherein the vision-based imaging system includes a rear vision-based imaging device, and wherein identifying the lane marker by a secondary sensing system includes identifying the lane marker using a side view vision-based imaging device.

12. The method of claim 10 wherein identifying the lane marker by a secondary sensing system includes identifying the lane marker using a global positioning-based system.

13. The method of claim 10 wherein identifying the lane marker by a secondary sensing system includes identifying the lane marker using a lidar-based sensing system.

14. The method of claim 1 wherein the error message indicates that the vision-based imaging system is uncalibrated.

15. The method of claim 1 wherein the error message indicates that a video connection is incorrectly connected.

16. The method of claim 1 wherein the error message indicates that the vision-based imaging system is inconsistent.

17. The method of claim 1 wherein generating an error message by an output device includes generating an audio message identifying the vision-based imaging system error.

18. The method of claim 1 wherein generating an error message by an output device includes generating a visual message identifying the vision-based imaging system error.

19. The method of claim 18 wherein the visual message identifying the vision-based imaging system error is displayed on a vehicle vision-based imaging output display screen.

20. The method of claim 1 wherein generating an error message by an output device includes generating a haptic response for identifying the vision-based imaging system error.

* * * * *